United States Patent
Fleckner

(10) Patent No.: US 8,219,271 B2
(45) Date of Patent: Jul. 10, 2012

(54) METHOD FOR CONTROLLING A DRIVETRAIN FOR A HYBRID VEHICLE

(75) Inventor: Marco Fleckner, Leonberg (DE)

(73) Assignee: Dr. Ing. h.c.f. Porsche Aktiengesellschaft (DE)

( * ) Notice: Subject to any disclaimer, the term of this patent is extended or adjusted under 35 U.S.C. 154(b) by 1003 days.

(21) Appl. No.: 12/138,360

(22) Filed: Jun. 12, 2008

(65) Prior Publication Data

US 2009/0005925 A1  Jan. 1, 2009

(30) Foreign Application Priority Data

Jun. 27, 2007 (DE) .................. 10 2007 029 809

(51) Int. Cl.
*B60L 11/00* (2006.01)
(52) U.S. Cl. .................. 701/22; 180/65.265; 903/946
(58) Field of Classification Search .......... 701/22; 180/65.225, 65.23, 65.25, 65.265, 65.275, 180/65.28, 65.285, 65.29; 477/4, 5, 6; 903/946
See application file for complete search history.

(56) References Cited

U.S. PATENT DOCUMENTS

| | | | | | |
|---|---|---|---|---|---|
| 3,525,874 | A | * | 8/1970 | Toy | 290/14 |
| 5,291,960 | A | * | 3/1994 | Brandenburg et al. | 180/65.27 |
| 5,323,868 | A | * | 6/1994 | Kawashima | 180/65.245 |
| 5,788,597 | A | * | 8/1998 | Boll et al. | 477/4 |
| 6,450,283 | B1 | * | 9/2002 | Taggett | 180/304 |
| 6,459,980 | B1 | * | 10/2002 | Tabata et al. | 701/70 |
| 2003/0057004 | A1 | * | 3/2003 | Morishita et al. | 180/65.2 |
| 2004/0035618 | A1 | | 2/2004 | Grassl et al. | |
| 2006/0001314 | A1 | | 1/2006 | Teslak et al. | |
| 2006/0004507 | A1 | | 1/2006 | Teslak et al. | |
| 2007/0114084 | A1 | | 5/2007 | Huelser et al. | |

FOREIGN PATENT DOCUMENTS

| | | |
|---|---|---|
| DE | 2815273 | 10/1979 |
| DE | 10162017 A1 | 7/2003 |
| DE | 102005027931 A1 | 1/2006 |
| DE | 10205027941 A1 | 2/2006 |
| WO | WO0226520 | 4/2002 |

OTHER PUBLICATIONS

Robert Bosch GmbH (Hrsg.): Kraftfahrtechnisches Handbuch, 21. Aufl. Dusseldorf, VDI-Verlag, 1991. ISBN 3-18-419114-1 S.630-632, Abb.S. T u.U.
Duration brake from Wikipedia, the free encyclopedia.

* cited by examiner

*Primary Examiner* — Khoi Tran
*Assistant Examiner* — Stephen Holwerda
(74) *Attorney, Agent, or Firm* — Gerald E. Hespos; Michael J. Porco

(57) ABSTRACT

A method for controlling a drivetrain for a hybrid vehicle is provided. The drivetrain has at least one internal combustion engine, a torque converter and an operational link to at least one drivable axle, an electrical energy store, and an electrical machine, which is usable as a generator for charging the electrical energy store during a recuperation operation. The electrical machine is provided on the pump wheel and the operational link being provided on the turbine wheel of the torque converter. A torque is introduced from the drivable axle via the operational link and through the turbine wheel into the liquid of the torque converter in recuperation operation in order to be dissipated as heat.

4 Claims, 1 Drawing Sheet

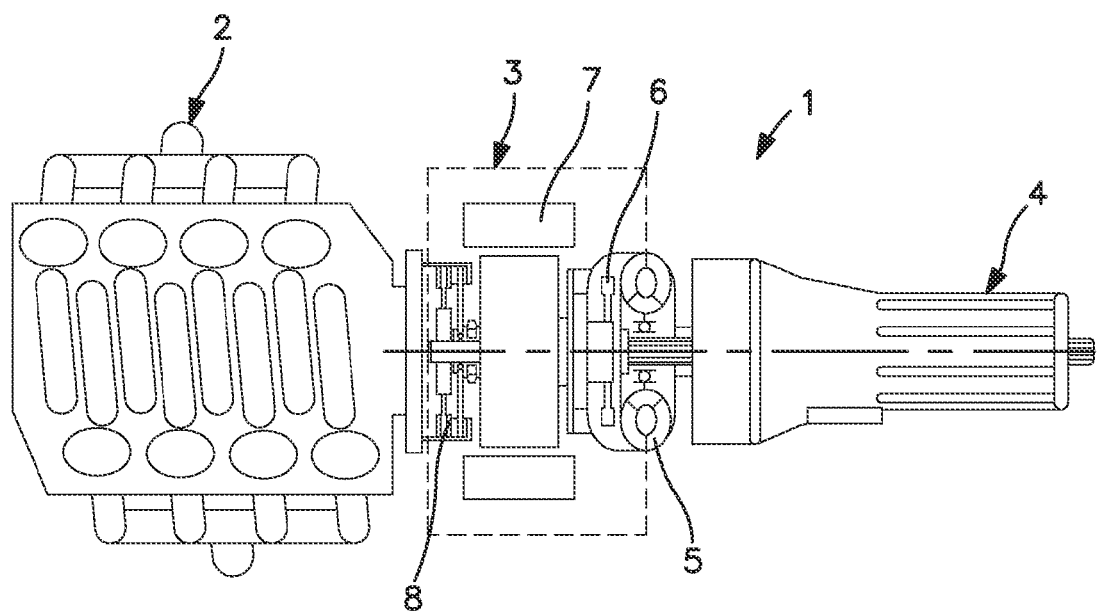

METHOD FOR CONTROLLING A DRIVETRAIN FOR A HYBRID VEHICLE

CROSS-REFERENCE TO RELATED APPLICATION

This application claims the priority of German Application No. 10 2007 029 809.0, filed Jun. 27, 2007, the disclosure of which is expressly incorporated by reference herein.

BACKGROUND AND SUMMARY OF THE INVENTION

The present invention relates to a method for controlling a drivetrain for a hybrid vehicle.

Hybrid vehicles typically have an internal combustion engine and at least one electrical machine. The electrical machine is either provided as a generator for charging an electrical energy store, and/or as a motor, for at least an auxiliary drive of the hybrid vehicle. Both are also frequently provided, in that sometimes the electrical energy store is charged and it is then used at other times for the electrical drive of the hybrid vehicle.

Furthermore, modern vehicles having automatic transmissions, i.e., typically also hybrid vehicles, usually have a torque converter. A liquid such as oil or water, inter alia is engaged and accelerated by the blades of an input-side pump wheel therein. The pump wheel, which is driven by the internal combustion engine and/or the electric motor, for example, thus converts mechanical energy into flow energy. The liquid flowing out of the pump wheel is deflected in its direction in an output-side turbine wheel. The turbine wheel, from which a transmission input shaft is connected downstream, for example, therefore experiences a reaction torque, by which a soft start of the vehicle is ensured, for example.

A hybrid vehicle has the advantage in relation to conventional vehicles having internal combustion engines that the kinetic energy may be reclaimed in large part (recuperation). For this purpose, torque is relayed from at least one drivable axle of the hybrid vehicle to the electrical machine. The reclaimed (recuperated) energy is buffered in the vehicle-side electrical energy store, e.g., a vehicle battery. The electrical machine operated as a generator exerts a decelerating torque (generator torque) on the hybrid vehicle in accordance with the degree of the generator usage. Recuperation may be provided in passive overrun and during active braking. Overrun is a vehicle state in which the vehicle is not actively driven, but rather is only driven forward by its intrinsic inertial mass, diverse driving resistances and possibly a generator torque decelerating it. During braking, the vehicle is actively decelerated by the driver, using generator torque and/or the operating brake.

In hybrid vehicles, fuel supply and ignition are typically shut down during the recuperation and, in addition, further precautions are taken to prevent the engine braking of the internal combustion engine and thus cause the kinetic energy to be delivered as completely as possible to the electrical machine driven as a generator. The internal combustion engine may thus be disengaged mechanically by a corresponding interruption clutch.

A problem results, however, if the electrical energy store is full or cannot currently accommodate any electrical energy for other reasons-such as exceeding temperature limiting values. In this case, the electrical machine is no longer operable as a generator, because the discharged electrical energy may no longer be accommodated by the electrical energy store. The electrical machine may thus no longer be used for decelerating the vehicle during braking and/or in overrun. A deceleration behavior of the hybrid vehicle which is unpleasant to the driver, because it is unaccustomed, thus results during the recuperation operation.

The object of the invention is to provide an improved method for controlling a drivetrain, which ensures a deceleration behavior of the hybrid vehicle, which always remains identical in recuperation operation, in particular independently of the quantity of electrical energy stored in the electrical energy store.

The object is achieved by providing a method for controlling a drivetrain for a hybrid vehicle, the drivetrain having at least one internal combustion engine, a torque converter and an operational link to at least one drivable axle, an electrical energy store, and an electrical machine, which is usable as a generator for charging the electrical energy store during a recuperation operation. The electrical machine is provided on the pump wheel and the operational link is provided on the turbine wheel of the torque converter. Torque is introduced from the drivable axle(s) via the operational link and through the turbine wheel into the liquid of the torque converter in recuperation operation for dissipation as heat.

According to the invention, in recuperation operation, a torque is introduced from at least one drivable axle of the hybrid vehicle, via the operational link and through the turbine wheel, into the liquid of the torque converter for dissipation of the introduced torque by way of heat. In other words, through the "reverse" operation of the torque converter, i.e., by introducing a torque via the turbine wheel instead of the pump wheel, it is operated at a "poor" efficiency. Because the electrical machine is connected to the pump wheel of the torque converter and only little energy is transmitted from the turbine wheel to the pump wheel due to the poor efficiency, the electrical machine operated as a generator rotates only very slowly or not at all. Therefore—as typical in recuperation operation—torque is introduced into the drivetrain. This torque is not converted into electrical energy, but rather into heat, however. According to the invention, a torque may thus be introduced into the drivetrain when conversion into electrical energy is not possible and/or intended. A hybrid vehicle having a deceleration behavior which always remains identical, known, and thus pleasant therefore results for the driver.

The torque is preferably introduced through the turbine wheel into the liquid of the torque converter in that a converter bypass clutch of the torque converter is open in recuperation operation. This is because an existing converter bypass clutch between the turbine wheel and the pump wheel is typically closed in recuperation operation to improve the efficiency of the torque converter. By opening the converter bypass clutch, a simple possibility thus results for introducing torque into the liquid of the torque converter via the operational link for dissipation as heat.

A speed regulation of the electrical machine is preferably provided. The proportion of torque which is to be introduced via the operational link into the liquid of the torque converter and dissipated as heat may be set relatively precisely by this speed regulation. A proportion of energy settable in accordance with the speed of the electrical machine may thus be dissipated by the opening of the converter bypass clutch.

A torque introduction into the liquid of the torque converter is especially preferably provided when the vehicle-side electrical energy store is entirely, or partially, incapable of storing the energy generated in recuperation operation as electrical energy. A recuperation behavior of the vehicle which always remains identical thus results. Because the electrical energy stored in the electrical energy store may be determined relatively precisely, the proportion of energy generated in recuperation operation and no longer storable as electrical energy is also known. A recuperation behavior, which always remains identical, is thus ensured by a speed regulation of the electrical machine in accordance with this proportion, independently of the electrical energy stored in the electrical energy store. A proportional torque introduction into the torque converter is provided when the vehicle-side electrical energy store may no longer completely store the energy generated in recuperation operation as electrical energy.

The invention is preferably implemented as a control unit in a hybrid vehicle. A device of this type may be implemented easily as a modification of one or more existing control units or as a separate control unit. The data required and/or delivered according to the invention may then be transmitted easily via the vehicle-side network, e.g., CAN.

Other objects, advantages and novel features of the present invention will become apparent from the following detailed description when considered in conjunction with the accompanying drawing.

BRIEF DESCRIPTION OF THE DRAWING

The FIGURE shows the schematic construction of the invention.

DETAILED DESCRIPTION OF THE DRAWING

In the FIGURE, a drivetrain 1 is shown, which has an internal combustion engine 2, a hybrid module 3, and a transmission 4. The transmission 4 is operationally linked to an axle of the hybrid vehicle in a known manner not otherwise shown in greater detail, e.g., via a differential. The hybrid module 3 has a torque converter 5, which includes a converter bypass clutch 6. The turbine side of the torque converter 5 is connected to the transmission 4 and the pump side of the torque converter 5 is connected to the electrical machine 7. The electrical machine 7 is operable as a motor, for auxiliary or sole drive of the drivetrain 1. Furthermore, the electrical machine 7 is operable as a generator for charging a vehicle-side energy store (not shown in greater detail). The internal combustion engine 2 may be disengaged from the hybrid module 3 via an interrupting clutch 8, to prevent drag torques in electrical driving operation.

The sequence of the method according to the invention is described as an example hereafter. A hybrid vehicle having the drivetrain 1 travels on an inclined route and is in recuperation operation. The electrical machine 7 of the hybrid vehicle is thus operated as a generator and charges a vehicle-side electrical energy store. If the vehicle-side electrical energy store is completely charged, but the hill descent has not yet ended and thus the recuperation operation still continues, the problem results that the braking action of the electrical machine 7 operated as a generator decreases. To ensure a uniform braking action, the braking behavior must be changed, in that the operating brake is switched in more strongly. However, this would result in braking behavior which varies and is thus unpleasant to the driver. Restarting the internal combustion engine 2, which would require a corresponding amount of energy, is also not advantageous for comfort reasons, because a starting torque is unpleasantly noticeable as a jerk and the thrust torque of the internal combustion engine 2 may not be metered.

Therefore, according to the invention, the converter bypass clutch 6, which has been closed until now in recuperation operation, is opened. A torque is still supplied via the operational link into the turbine wheel of the torque converter 5 from the drivable axle(s) of the hybrid vehicle. However, because the converter bypass clutch 6 has been opened, this torque is no longer transmitted, more or less without loss, from the turbine wheel to the pump wheel. Rather, the turbine wheel of the torque converter 5 is now driven with an open converter bypass clutch 6. The poor efficiency resulting during this "reverse" operation of the torque converter 5 is intentional in this case. This is because the introduced torque is discharged from the turbine wheel to the surrounding liquid, e.g., oil. Therefore, a torque, which now no longer drives the electrical machine 7, but rather is dissipated as heat in the torque converter 5, may still be introduced into the drivetrain 1 from the drivable axle(s) via the operational link. This is because the efficiency of the torque converter 5 worsens significantly due to the speed differential between the pump wheel and the turbine wheel and the majority of the introduced energy is converted into heat. Because the electrical machine 7 rotates very slowly or not at all in spite of the high applied torque, almost no electrical energy is generated. A deceleration behavior of the hybrid vehicle having the drivetrain 1, which remains identical, thus results in recuperation operation, although the electrical energy store is already full.

Of course, the idea according to the invention is similarly applicable in non-electrical energy stores in a hybrid vehicle as well, e.g., in a mechanical energy store (flywheel).

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a drivetrain of a hybrid vehicle, the drivetrain having at least one internal combustion engine, a torque converter and an operation link to at least one drivable axle, an electrical energy store, and an electrical machine usable as a generator for charging the electrical energy store during a recuperation operation, the method comprising the acts of:
    providing the electrical machine on a pump wheel of the torque converter and the operation link on a turbine wheel of the torque converter;
    determining whether operating conditions of the hybrid vehicle are appropriate for the recuperation operation;
    determining whether additional electric energy may be stored in the electrical energy store;
    introducing a torque from the at least one drive axle, via the operational link and through the turbine wheel, into a liquid of the torque converter inif the recuperation operation is determined to be appropriate; and
    opening a converter bypass clutch and keeping the converter bypass clutch open for dissipating the introduced torque in the liquid of the torque converter as heat if a determination is made that additional electrical energy should not be stored while the operating conditions of the hybrid vehicle otherwise are appropriate for the recuperation operation.

2. The method according to claim 1, further comprising the act of providing speed regulation of the electrical machine.

3. A hybrid vehicle, comprising:
    a drivetrain for a hybrid vehicle, the drivetrain including at least one internal combustion engine, a torque converter and an operational link to at one drive couple axle, an electrical energy store, and an electrical machine usable as a generator for charging the electrical energy store during a recuperation operation, the electrical machine being provided on a pump wheel of the torque converter and the operational link being provided on a turbine wheel of the torque converter, the torque converter further comprising a converter bypass clutch; and a control unit for controlling the drivetrain of the hybrid vehicle, the control unit being operatively configured to determine whether operating conditions of the hybrid vehicle are appropriate for the recuperation operation, to determine whether additional electric energy may be stored in the electrical energy store, to control the introduction of a torque from the at least one drivable axle, via the operational link and through the turbine wheel, into a liquid of the torque converter in response to operating conditions appropriate for the recuperation operation and to open the converter bypass clutch and to keep the converter bypass clutch open for dissipating the introduced torque in the liquid of the torque converter as heat if a determination is made that additional electrical energy should not be stored while the operating conditions of the hybrid vehicle otherwise are appropriate for the recuperation operation.

4. The hybrid vehicle according to claim 3, wherein the control unit regulates a speed of the electrical machine.

* * * * *